United States Patent Office 2,896,325
Patented July 28, 1959

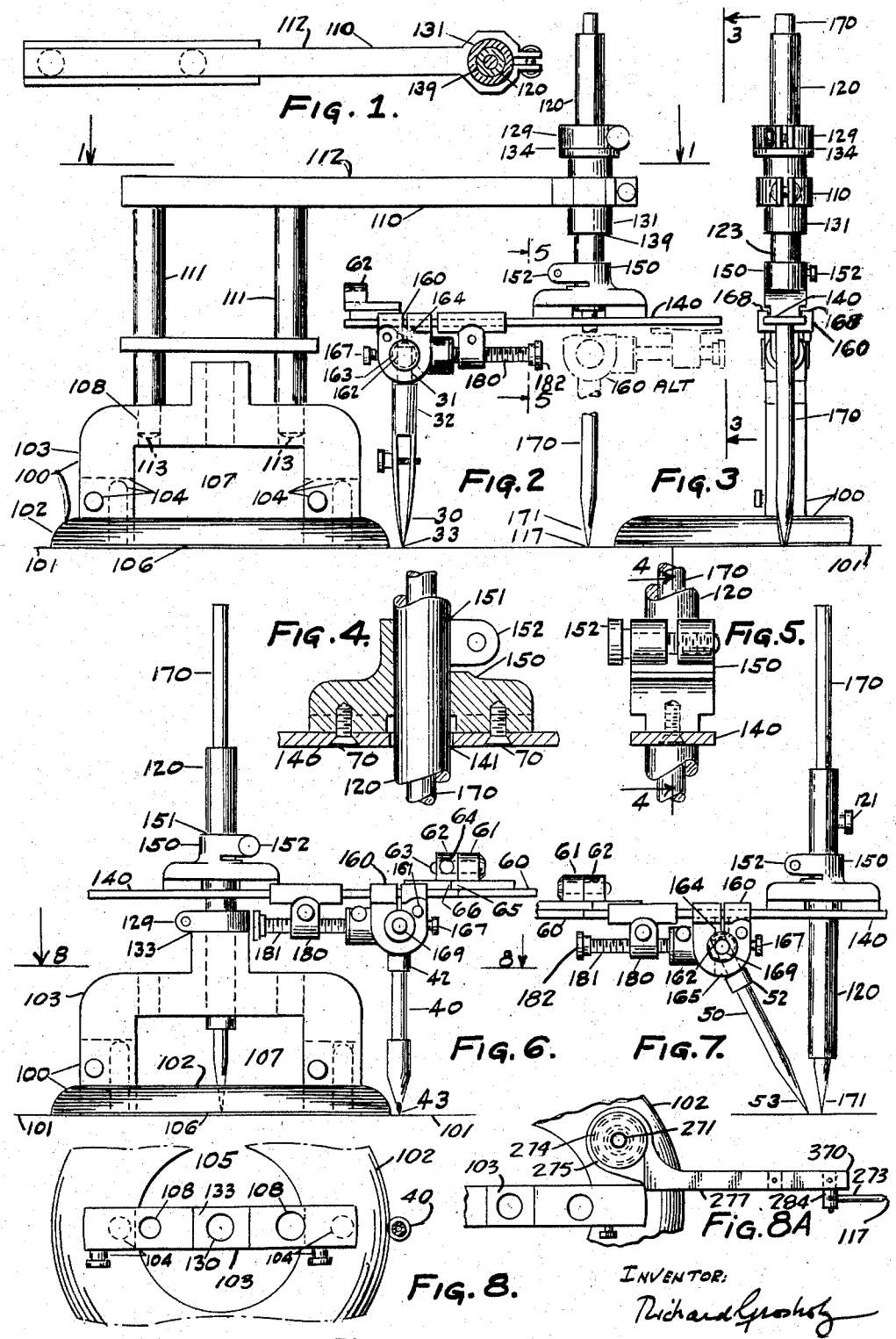

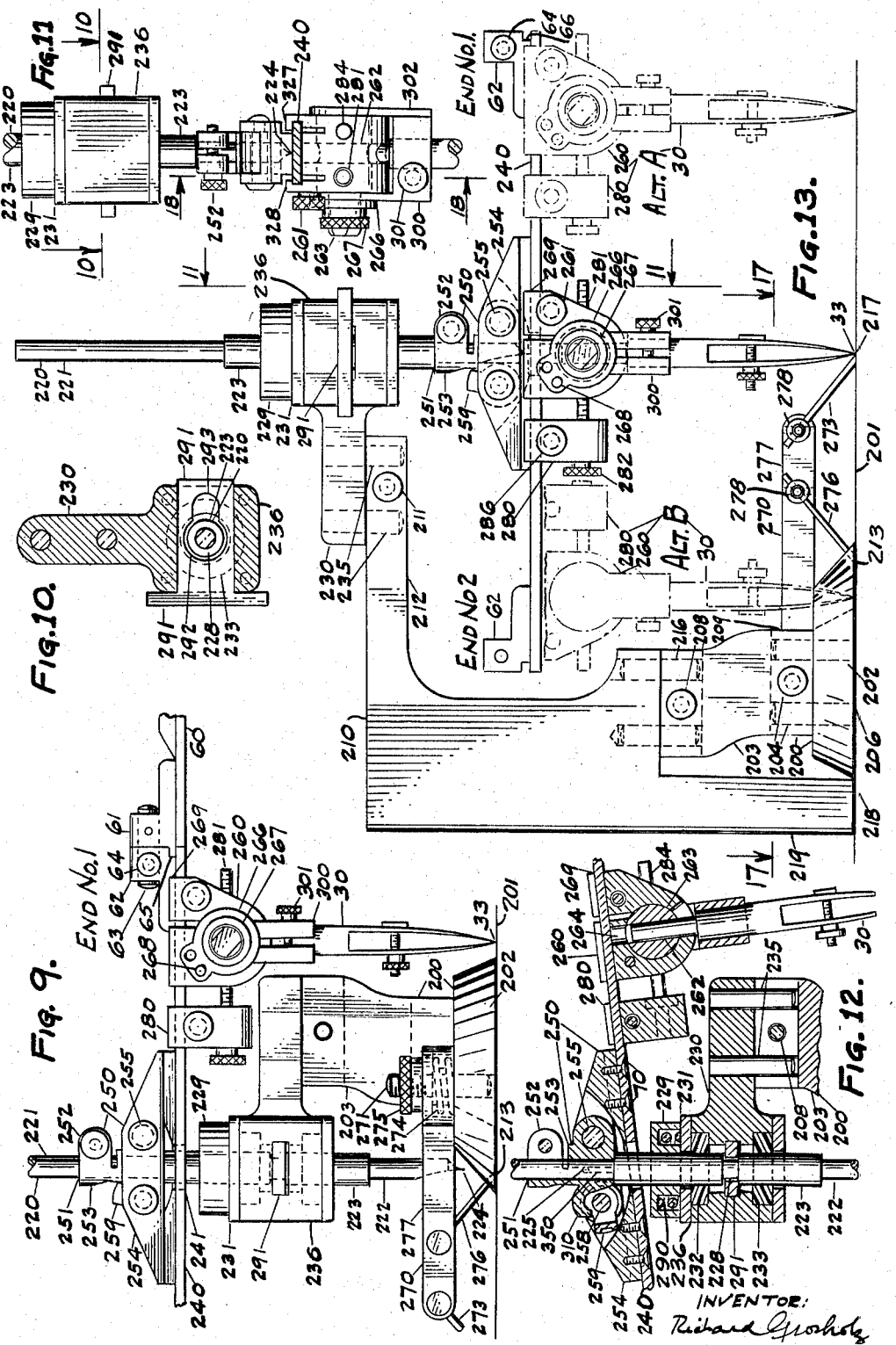

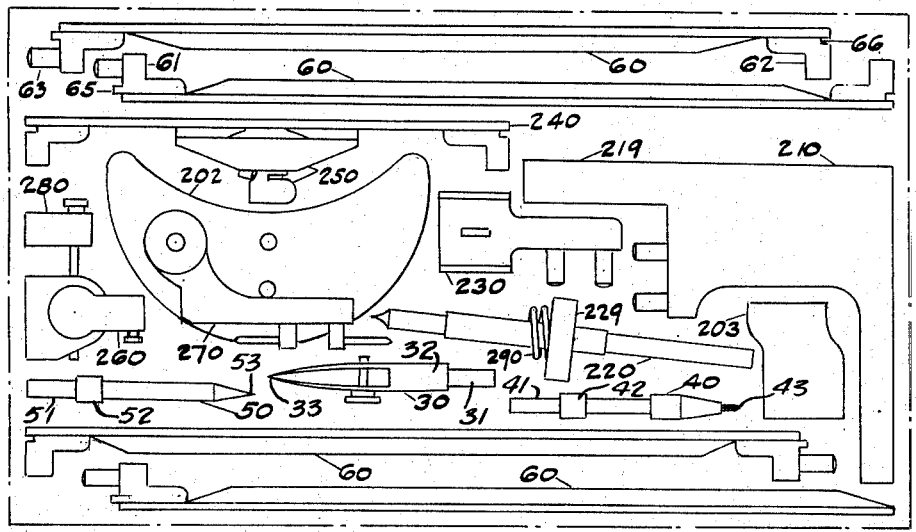
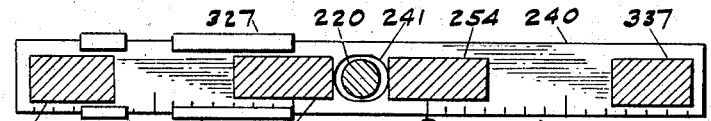
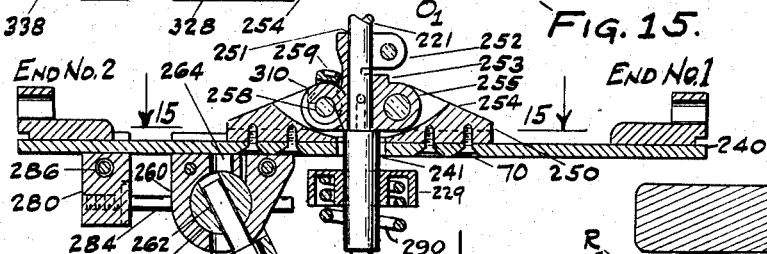
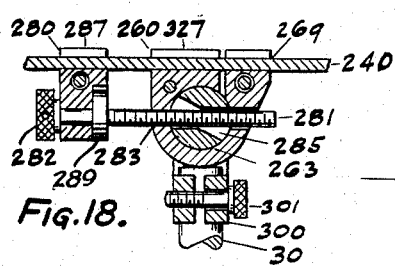
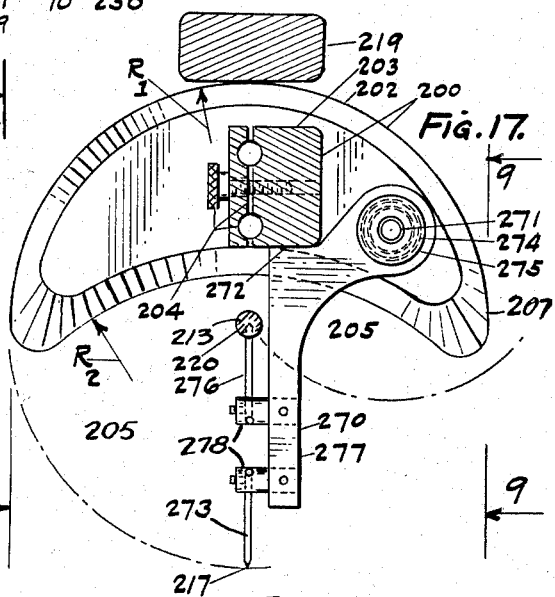

2,896,325

DRAFTING IMPLEMENTS

Richard Grosholz, Ardmore, Pa.

Application July 9, 1956, Serial No. 596,625

19 Claims. (Cl. 33—27)

This invention offers improvements in instruments used in the age-old art of the drafting of circles.

It is a primary object of this invention to provide a support separate in operation from and movable about a drafting board for supporting a beam compass pivot in the drafting of circles of all sizes requirable on such a board, with the use of the same compass parts, particularly the same scriber, without center point impingement on the working surface.

It is an objective to provide means accompanying the aforesaid pivot support for accurately indicating the location of the centers of circles being drawn, such indicating means being easily retractable from paths of movable compass parts.

It is an object that the thus extraneously supported beam compass provide means for drafting true and accurate circles, without the impairment of any function usual in a compass, such as the ability to draw dot-and-dash circles.

It is intended that the beam compass which is supported and accompanied by the pivot support and the center finding means of this invention be able to work as a known beam compass without said supports and center finding means. It is further desired to provide a pivot support, with center finding means, applicable to a beam compass, able, when separate from the support and center finding means of this invention, to draw circles of all needed sizes. It is also an objective to provide a system of scale markings on the compass beam for radius setting, which shall be useful in any possible application of the compass.

It is a further objective that the pivot support be compact in size and comprise parts packable, together with the beam compass, in a conventional pocket-sized drafting instrument case.

My invention comprises pivot supports and circle center indicating means for a beam compass able, without the supports and indicating means of my invention, to draw circles, preferably from zero radius up. The compass to be supported is formed of endwise joinable links or beam sections. A pivot passable through one initial link is fastened releasably and perpendicularly to said link. A cursor dependant from the beam shifts a scriber under the beam coplanarly with the pivot. Used in concert with the supports, the scriber is held perpendicular to the beam; used without the supports, the scriber, if desired, may be inclined shiftably contactable with the pivot tip. To support the compass pivot erect without center impingement on the working surface, the invention provides a base movable on the working surface and a bracket attachable to the movable base. The base, devoid of the bracket, holds the pivot concentrically with the base for the drafting of large circles around the base, with the pivot in a first position in relation to the base, with an opening in the base revealing the loci of the centers of circles being drafted. The bracket mounted on the base holds the pivot at one side of the base sufficiently away to enable the drafting of small circles without interference with the base, with the pivot thus being held in a second position in relation to the base. Retractable pointing means precisely indicate the location with relation to the base of the centers of all circles which are to be drawn.

Figures 1 to 8, inclusive, show one embodiment of my invention.

Figure 1 is a plan view, partly in section, taken at line 1—1 in Figure 2.

Figure 2 is a longitudinal elevation of the arrangement of this embodiment in the drafting of small circles.

Figure 3 is an end elevation taken at line 3—3 in Figure 2.

Figure 4 is a detail section taken at pivot axis 4—4 in Figure 5.

Figure 5 is an end elevation detail at lines 5—5, Figure 2.

Figure 6 is a longitudinal elevation of the arrangement of this embodiment in the drafting of large circles. Base 100 is to be noted in the same position in both elevations, Figures 2 and 6.

Figure 7 is a longitudinal elevation of the beam compass which is shown supported in other figures by the means of this invention.

Figure 8 is a plan section view taken at line 8—8 shown in Figure 6.

Figure 8A is a part of the plan section view comprising Figure 8, with parts adapted thereto which are shown in plan in Figure 17 and in elevation in Figure 9 and Figure 13.

Figures 9 to 18, inclusive, show a second embodiment of my invention.

Figure 9 is a longitudinal elevation of the arrangement of this embodiment in the drafting of large circles; it is located with respect to base 200 by line 9—9 in section plan Figure 17.

Figure 10 is a detail plan section at lines 10—10, Figure 11.

Figure 11 is a partial elevation at lines 11—11 in Figure 13 showing a section through link 240 and block 254.

Figure 12 is a partial section elevation taken in the plane containing the axes of pivot 220 and scriber 30; the compass beam is inclined in partial rotation about hinge pin 255.

Figure 13 is a longitudinal elevation of the arrangement of this embodiment in the drafting of small circles; it is located with respect to base 200 by line 13—13 in section plan Figure 17.

Figure 14 is a diagram showing a possible arrangement of all the items comprised in this embodiment, with the parts being disassembled and packed in a flat case of the type usually employed in the care of drafting tools when not actually in use.

Figure 15 is a section plan view locatable by line 15—15 in section view 16, but portraying the complete object of which Figure 16 is a section.

Figure 16 is a longitudinal sectional elevation of the beam compass which is shown supported in other figures by the means of this invention.

Figure 17 is a section plan view taken at line 17—17 in Figure 13.

Figure 18 is a partial section elevation at line 18—18 in Figure 11.

In the embodiment of my invention shown in Figures 1 to 8, inclusive, base 100 comprises a flat annular bottom plate 102 with a vertical median flange 103. The lower part of flange 103 is shown cut out at 107 adjacent to annular hole 105 in base plate 102, Figures 2 and 8.

Figure 6 shows the arrangement of this embodiment in the drafting of large circles. An elongated tubular pivot 120 extends vertically through upstanding flange 103 in a first position relative to base 100. Collar 129 is affixed along the pivot length above journalling length 123. Collar 129 adjacent top edge 133 of an upwardly extending portion of flange 103 holds pivot 120 spaced above plane 101 of the bottom of base 100 above opening 105. Pivot 120 is rotatably journalled below collar 129 in journalling means including hole 130 through flange 103, with the pivot axis perpendicular to base bottom plane 101 and co-axial with the outside circular outline of base 100.

An elongated bar 140 comprising a first longitudinal section or initial link of a compass beam is shown slideably extending traversely between flanged guides 168 in the top of a block 160 constituting a cursor. The cursor 160 may be secured in a selected position along the link 140 by screw 161. The beam compass scriber, shown as pencil scriber 40 in Figure 6, is secured in the bottom of cursor 160 by screw 169 shown in Figure 7. Pivot 120, in the portion above its affixed collar 129, extends through initial link 140, and pivot 120 is secured to link 140 by clamp block 150 secured to link 140 by screws 70, Figure 4. Pivot 120 passes through hole 141 in 140 and through hole 151 in block 150, and is clamped in 150 by lug and screw means 152. The scriber is shown held with its scribing tip 43 in contact with base bottom plane 101, shiftable axially coplanarly and parallel with pivot 120. Cursor 160, when positioned at the extreme end of initial link 140, locates the scriber tip a distance apart from the outer edge of base 100 equivalent to a minor fraction of the length of the radius of the outer edge circular outline, as from one-twentieth to one fifth of said radius. Thus the scriber positioned by the cursor when endwise disposed on the initial link may draw a circle about the base slightly larger than the base outline, and extension beam links as 60 in Figure 6, congruent in section to initial link 140 and to each other, may be joined end to end in any required number to implement the drafting of circles of any desired diameter about the base. Means such as extending connection 61, comprising bar 63 and lip 65 on one end of extension link 60, and receiving connection 62 with screw 64 and recess 66 on the initial link, may be provided to effect a releasable junction. The joining means described is solely illustrative, and other known means of joining the links end to end may be used within the scope of this invention.

Figure 2, together with partial top view Figure 1 and with end view Figure 3, shows pivot 120 held perpendicular to base bottom plane 101 in a second position relative to base 100 for the drafting of small circles at one side of the base. This arrangement comprises said base 100, with bracket 110 with two vertical legs 111 with their lower ends 113 inserted in holes 108 (Figure 8) on edges of upstanding flange 103 aforesaid. Spacing means as legs 111 support a horizontal cantilever arm 112. Vertical sleeve 131 is affixed at the end of cantilever 112. Said pivot 120 extends through sleeve 131, perpendicularly to base bottom plane 101, with said collar 129 affixed to pivot 120, positioned therealong as in the previously described arrangement. Collar 129 adjacent the top of flange 134 on the upper end of sleeve 131 supports pivot 120 rotatably journalled below collar 129 along pivot journalling length 123 in hole 139 through sleeve 131. With the pivot 120 thus remotely spaced above base bottom plane 101, initial link 140, aforesaid, is dependantly secured by said clamp block 150 to the lower end of pivot 120. The scriber, in this case equivalent scriber 30, is fastened as before in the bottom of cursor 160 dependant as before from the initial link 140. Scribing tip 33 held in contact with base bottom plane 101, is now shiftable into co-axiality with pivot 120, enabling the drafting of circles of zero minimum radius. The cantilever 112 and sleeve 131 position the pivot 120 sufficiently remote from the base outline to allow the cursor 160 when endwise disposed on initial link 140, to position a scriber as 30 free to rotate to one side of base 100, and to draw circles equivalent to those draftable with the cursor endwise disposed on initial link 140 with the pivot held rotatable in the first position with relation to base 100 previously described, together with smaller sized circles as required.

Pin 170, slideable in tubular pivot 120, is provided to indicate the locus in relation to the position of base 100, of the center of circles draftable with either described arrangement. In the arrangement for drafting smaller circles, it will be necessary at first to position the base 100 with respect to the circle center locus, with the cursor 160 disposed on the initial link 140 somewhat remote from a position of pivot-scriber co-axiality for the drafting of very small circles. After the base has been established in position, pin 170 may be lifted; with pin point 171 elevated above the bottom surface of initial link 140, cursor 160 may shift the scriber as desired, as from the position shown in solid lines in Figure 2, to the dotted position marked "160 ALT."

In Figures 1 to 8, inclusive, links 140 and 60 are shown as flat bars with width horizontal. Other shapes, as triangular, T, or generally circular may be employed without departing from the spirit of this invention, provided that the links are joinable end to end and sufficiently congruent in section for shifting of the cursor along all of the links.

Figures 1 to 8 inclusive show ink scriber 30, pencil scriber 40 and steel point 50, equivalently in this specification, as equal in length, and enlargements 32, 42 and 52 and scribing tips 33, 43 and 53 which are co-axial with their equivalent respective shanks 31, 41 and 51 identified in diagram Figure 14.

Base 100 is shown in Figures 2, 6 and 8 as comprising an annular disc 102 and a vertical median flange 103. The disc and flange may be formed of one piece, or of two permanently affixed pieces. Preferably they will comprise separate items, releaseably affixable in proper alignment by means as dowel pins, slots and tightening screws as 104, Figures 2 and 8.

Base 100 may have adhesively affixed to its bottom surface a thin film 106 comprised of a material not injurious in normal use to drafting surfaces, but more frictionally resistant than bare metal to sliding over said drafting surfaces. A thin sheet of fine grained sand paper, as an example, may be used for this purpose.

Figures 2 and 6 show initial compass beam link 140 slideably extending transversely between flanged guides 168 atop cursor 160 and equivalent flanged guides atop setting head 180. The setting head 180 is provided, if desired, for use in positioning cursor 160 by means of vernier screw rod 181 arranged in parallel relation to the length of the compass beam as link 140. Figures 2 and 6 show vernier screw 181 rotatably affixed to cusor 160 and extending threadedly through setting head 180 and terminating in knurled nut 182. The mechanical details shown of the setting head and the vernier screw are merely illustrative, and equivalent known means may be substituted without departing from the spirit of this invention.

It is stated in connection with the objectives of this invention that the supports and center indicating means herein projected be applicable to a beam compass operable without the use of the said supports and center indicating means. In the apparatus of Figure 6, pin 170, pivot 120, clamp block 150, links 140 and 60, together with cursor 160 and scriber as 40, with or without collar 129, may be withdrawn from base 100 and used as a beam compass, with the releasable affixing of pin 170 in tubular pivot 120. It is also an objective that supports and center indicating means of this invention be applicable to a beam compass operable without said supports and center indicating means in the drafting of circles of all sizes requirable on a drafting board. With the use of the supports characterizing this invention in the drafting of circles of all sizes requirable on the drafting board, and with the limited use of the compass without the supports described earlier in this paragraph, the scriber is held perpendicular to the working surface. In this position radius length is not affected by pencil scriber wear. However, if the compass is used to draw circles of a very small size without the use of the supports, the scriber must be inclined sufficiently to allow scriber and pivot to be brought into contact at their tips. Figure 7 shows the beam compass parts referred to before, with the scriber 50 at an angle to the vertical; and with sliding pin 170 secured in tubular pivot 120 by screw 121, with sliding pin tip 171 and inclined scriber tip 53 equally spaced vertically below the under side of initial link 140. In the arrangement of Figure 7, tips 53 and 171, shown spaced apart, may be brought into contact if desired. In an apparatus with the cursor 160 devised to hold the scriber perpendicular as in Figures 2 and 6, and alternately, to hold the scriber inclined, as in Figure 7, a knuckle pin 163 may extend through the body of cursor 160 in perpendicular relation to the compass beam as 140. If a vernier screw as 181 is used, at least the corner of cursor 160 remote from screw 181 is rounded off coaxially with pin 163. The scriber shank enters the bottom of the cursor and extends diametrically through knuckle pin 163 to the end of hole 162 therein. In Figure 2, shank 31 is shown positioned in hole 162 in pin 163. Figure 7 shows axial screw 169 securing scriber 50 in cursor 160. Groove 165 in the bottom of cursor 160 permits a partial rotation of knuckle pin and scriber coplanarly with pivot 120. Knuckle pin 163 may be secured if desired with the scriber perpendicular, and alternately, with the scriber inclined, by set screw 167. Set screw 167 extends threadedly into the cursor 160, effecting selective engagement with one of two countersinkings provided on the circumference of pin 163. The inclination of the scriber with the vertical which will permit contact of the scriber tip with the tip 171 of pin 170, with pin 170 releasably secured in pivot 120 may lie between 20 and 40 degrees. The provision for holding the scriber inclined enables the compass devoid of the supports provided by the invention to draw circles from zero radius up, and further provides a useful means of checking the alignment of the pivot with the scriber.

Hole 164, in the top of cursor 160, implements an alignment check for the entire apparatus. In Figure 2, the scriber may be shifted into alignment with pivot 120; with the scriber omitted, pin 170 may be extended through cursor top hole 164, knuckle pin hole 162 and groove 165 to locate axis intersection 117 on base bottom plane 101 with respect to base 100. With pin 170 withdrawn, a rotating scriber may precisely draft a point at intersection 117.

In Figure 7, the scriber 50 is seen as inclined in cursor 160 towards the end of the cursor remote from screw 181. In the design of this embodiment, in order to conserve length in initial link 140 and relatedly in cantilever 112, as evidenced in Figure 2, screw 181 and setting head 180 are located adjacent pivot 120 in assembling cursor 160 to link 140. Contrariwise in Figure 7, to enable the shifting the scriber tip as 53 adjacent the pivot tip 171, cursor 160 and initial link 140 are assembled with screw 181 and setting head 180 remote from pivot 120. In view of the need for reversing the cursor-beam relationship, the axis of pivot 120 intersects the initial link 140 at mid-width perpendicularly to the top of the rectangular beam section employed in the figures shown.

Figures 9 to 18, inclusive, present a second embodiment of my invention. Here the use of a lunate base in place of an annular base affords an economy in part sizes, an unencumbered view of the drawing in selected directions, and the requirement of one bearing only, for the pivot. The compass is enabled to draw large circles around the base when the bearing is held in a first position with relation to the base, and the compass is further enabled to draw small circles with the bearing held in a second position sideways remote of said base, the two positionings of the bearing enabling the drafting by the compass of circles of all requirable sizes.

In this embodiment, base 200 comprises a flat lunate bottom plate 202 with an upstanding median flange 203. Figure 9 shows the arrangement of this embodiment as applied to the drafting of large circles. A horizontal arm 230 is releasably attached to the top edge of flange 203 by dowel pins 235 on 230, and slot and screw means 208 in the top of the flange 203 in its first position with relation to base 200. A sleeve 236 is vertically affixed to the end of arm 230: see also Figure 12. Pivot shaft 220 with collar 229 affixed above pivot journalling length 223 extends through sleeve 236. Collar 229 adjacent the top 231 of sleeve 236 holds pivot 220 spaced above plane 201 of the bottom of base 200. Pivot 220 is rotatably journalled in sleeve 236, over base opening 205, (Figure 17). The axis of pivot 220 thus perpendicularly intersects base bottom plane 201 in a first position with relation to base 200 at the center 213 of the outer circular arc of base 200.

An elongated bar 240 comprising a first longitudinal section or initial link of a compass beam slideably extends traversely between flanged guides 325 and 327 in the top of block 260 comprising a cursor. Cursor 260 may be secured in a selected position along link 240 by screw 261. A beam compass scriber, in Figure 9 comprising ink scriber 30, is secured in the bottom of cursor 260; the scriber extends downwardly through a cross bar or stirrup 300 spaced below the cursor dependant from the opposite sides of the cursor. Screw 301 fastens the scriber in the stirrup and thus in the cursor. Pivot 220, in its portion above fixed collar 229, extends through initial link 240, the pivot being secured to the link 240 by clamp block 250. Pivot 220 passes through hole 241 in link 240 and is secured to clamp block 250 by lug and screw means 252; clamp block 250 may consist of a single part or it may comprise hinged clamp 253, together with block 254 with clasp means identified later.

Figure 9 shows scribing tip 33 contacting base bottom plane 201. The axes of pivot 220 and scriber 30 are parallel, and in shifting, the scriber axis continues in a plane which contains the pivot axis. Cursor 260, when positioned at the extreme end of initial link 240, may set the perpendicular scriber tip a distance apart from the outer edge of base 200 equivalent to a minor fraction of the length of the radius of the outer arc of the base, as from one-twentieth to one fifth of said radius. Thus the scriber positioned by the cursor when endwise disposed on the initial link may draw a circle about the base slightly larger than the base outline, and extension beam links as 60, as now shown in Figure 9, congruent in section to initial link 240 and to each other, may be joined end to end in any required number to implement the drafting of circles of any desired diameter about the base. As previously enumerated in connection with Figure 6, means such as extending connection 61, comprising bar 63 and lip 65 on one end of link 60, and receiving connection 62 with screw 64 and recess 66 on the initial link, may be provided to effect a releasable junction. This joining means is solely illustrative, and other known means of uniting the links may be used within the spirit of this invention.

Figure 13, together with partial end view Figure 11, shows arm 230 and sleeve 236 held by bracket 210 in the second position of the arm and the sleeve in relation to base 200, this position enabling the drafting of small circles. This arrangement comprises the aforesaid base 200, with spacing means 210 comprising a relatively thin block releasably attached in a vertical position to the top edge of the said upstanding median flange 203, by means of dowel pins 216 on block 210, and the aforesaid slot and screw means 208 in the top of flange 203. The top of block 210 extends as a cantilever 212 over lunate base concave opening 205 (Figure 17), with the side of spacing block 210 opposite cantilever 212 comprising counterweighting 219.

Said horizontal arm 230 with said bearing sleeve 236 endwise affixed is releasably attached along the top edge of cantilever 212 by said dowel pins 235 on arm 230, and slot and screw means 211 in cantilever 212. Said pivot 220 extends through sleeve 236 perpendicularly to base plane 201. Said collar 229 affixed on pivot 220 being adjacent the top 231 of sleeve 236 supports pivot 220 rotatably journalled in sleeve 236 along pivot journalling length 223. With the pivot 220 thus remotely spaced above base bottom plane 201, initial link 240, aforesaid, is dependantly secured by said clamp block 250 to the lower end of pivot 220. The scriber, as 30, is fastened in the bottom of said cursor 260 be described means 300 and 301, with the cursor dependant as before from initial link 240. Scribing tip 33, held in contact with base plane 201 is now shiftable into co-axiality with pivot 220, enabling the drafting of circles of zero minimum radius. The cantilever arm 212 and sleeve 236 position the pivot sufficiently remote from the base outline to allow the cursor 260, when ultimately disposed on initial link 240, to position a scriber as 30 free to rotate at one side of the base 200, and to draw circles equivalent to those draftable with the cursor endwise disposed on initial link 240 in the previously described arrangement of this embodiment together with smaller sized circles as required. In drafting small circles aside of the base, with the cantilever arm extending across concave opening 205 of lunate base 200, a part of the scriber path will lie in lunate base concave opening 205 with the axis of pivot 220 intersecting base bottom plane 201 at a second position relative to base 200, this second position being at the center 217 of the arc defining opening 205.

Center indicating means 270 comprises a vertical shaft 271 secured in a tip of lunate base 200 as a pivot for horizontal finger 277. Two spaced apart pins 278 extend horizontally through finger 277. Needles 273 and 276 extend through pins 278. When the finger 277 is rotated into contact with upstanding median flange 203 as a limit, each of the two needle tips contacts one of the two loci of pivot axis intersection with the base bottom plane 201 relative to base 200 deriving from the two positions in which sleeve 236 may be supported, relative to base 200 as previously described. A compression spring 274 is housed about pivot 271 on the underside of finger 277. The upper end of pivot 271 is threaded and extends through knurled nut 275. With surface 272 (Figure 17) contacting surface 209 (Figure 13), and needles 276 and 273 simultaneously indicating loci 213 and 217, spring 274 may be held compressed by tightening nut 275; with nut 275 loosened, spring 274 raises finger 277 and allows the finger to be swung out of the scriber path. It is obvious that the cursor and the scriber may be shifted to zero radius position without interference with the center indicating means shown in connection with this embodiment of the invention.

In Figures 9 to 18 inclusive, compass beam initial link 240 is shown as a flat bar; extension bar 60, identical for the purposes of this specification with extension bar 60 in Figures 1 to 8 is shown as a flat bar congruent in section with link 240 but reinforced on the top side with an axial rib. Links 240 and 60 may be designed to comprise triangular, T or generally circular shapes, providing that the links are joinable end to end and sufficiently congruent in section for the shifting of the cursor along all of the links.

Throughout Figures 9 to 18, scribers 30, 40 and 50 are shown as equivalent to and identical with the similarly numbered items previously described in connection with the embodiment of this invention illustrated in Figures 1 to 8, inclusive.

Base 200 is shown as comprising a lunate disc 202 and an upstanding median cross flange 203. The disc and flange may be formed of one piece, or of two permanently affixed pieces. Preferably they comprise separate items, releasably affixable in their proper alignment by means as dowel pins, slots and tightening screws as 204, Figure 13. Diagram Figure 14 illustrates an arrangement of the parts described in connection with this embodiment of my invention in a familiar type of flat pocket-sized instrument case, including beam compass and scribers, pivot supporting means and center indicating means. This arrangement is chiefly implemented by the separation of base 200 into its parts.

Base 200 may have a friction increasing film 206 applied to its underside, as previously described in connection with base 106.

To enable initial link 240 to be rigidly secured to pivot 220 when desired, and alternately, to allow the flexibility required in such operations as drawing dot and dash circles, clamp block 250 connecting link 240 and pivot 220 has been mentioned as consisting if desired of hinged clamp 253, block 254 and clasp means. Figure 9, and sections Figures 12 and 16, show 254 as a first block affixed by screws 70 to initial link 240. 253 comprises a second block disposed lengthwise of link 240 and lying within block 254; pivot 220 extends through hole 251 in 253 perpendicularly to the length of link 240, the hinge means being closed, as in Figure 9; screw and slot means 252 secure second block, or hinged clamp, 253 to pivot 220. Hinge pin 255 extends through blocks 253 and 254 perpendicularly to link 240 length; hinge 255 is spaced apart from pivot 220 towards the end of link 240 under which the scriber is shifted when held perpendicularly by the cursor. Catch means for securing blocks 253 and 254 in the closed position are disposed apart from pivot 220 towards the end of link 240 remote from hinge 255. A catch means is shown comprising pin 258 extending parallel to hinge pin 255 through block 254 and the legs of U-shackle 259. In securing the hinge means closed, U-shackle 259 swings about pin 258 and straddles and tightens lug 310 against the top of pin 258. Lug 310 is integral with hinged clamp 253, being disposed remote from the position in block 253 of hinge 255. This particular catch means is described solely as an example of equivalent devices known in the art and applicable within the spirit of this invention.

Collar 229 is preferably permanently affixed to or integral with pivot 220. Figure 12 shows spiral compression spring 290 housed in a groove on the underside of collar 229, urging collar 229 upwardly apart from top surface 231 of sleeve 236 against the weight of the pivot and attached links. Figure 10 details detent 291 provided to optionally hold collar 229 against surface 231 compressing spring 290. Detent 291 comprises a horizontally disposed plate extending slideably through sleeve 236 perpendicularly to the sleeve axis. Detent 291 has a longitudinal slot 392 ending in hole 292. Pivot 220 passes freely through hole 292. Constriction 228, slightly greater in length than the thickness of plate 291, is provided along pivot 220, with the width of slot 293 less than the diameter of pivot 220 and exceeding the diameter of pivot constriction 228. While the shifting of slot 293 into engagement with constriction 228 and the consequent holding of collar 229 adjacent sleeve top 231, pivot 220 and the compass beam are lowered sufficiently to allow the scriber tip to contact the base bottom plane 201. Detent means 291 is merely illustrative, and equivalent means may be substituted therefor without departing from the spirit of this invention.

Figure 12 shows bearing sleeve 236 having antifriction sleeves 232 and 233, which sleeves may comprise rings of metal, as bronze, or of plastic, as nylon. Ball bearing races may replace said rings with the single arm and bearing unit, 230 and 236, identically related directionally to base 200 in the two required arrangements, possibly more satisfactory drafting results may derive along with construction economy. If the circles drawn characteristically lack perfect accuracy, with these arrangements, errors in maximum small and minimum large concentric circles may not be perceptible.

The instantaneous correct assembly of pivot 220 in clamp block 250, in the selected one of the two arrangements described, is effected by means of the similar pivot constrictions in section at top 221 and at bottom 222 of the pivot. Hole 251 in clamp 253 coacts with reduced pivot end sections 221 and 222 as selected; while fully diametered pivot intermediate section 223 journals in sleeve bearing 236. The total length of lower end section reduction 222 including the length of a point, if provided, as 224, ultimately engaged by clamp 253, must not permit the pivot end, as 224, to extend below the bottom surface of initial link 240, in order to permit the positioning of the cursor with the scriber coaxial with the pivot as shown in Figure 13. Further details of the design require the pivot length from the lower tip as 224 to the lower end of reduction 221 to exceed the lift given bearing arm 230 by bracket block 210 by the construction detail distance by which the bottom of hinge clamp 253 is spaced from the top of link 240, as seen in sectional view Figure 16. This same spacing is evident in Figure 9. Figure 9 further indicates top reduction 221 of pivot 220 exceeding the height of clamp 253 by an amount sufficient to grasp with the fingers of the hand.

Figures 13 and 17 indicate the side of bracket block 210 opposite cantilever 212 comprising a counterweight 219, and extending downwards outside base 200 to base bottom plane 201 as a stabilizer. Friction increasing film 218 may be applied to the bottom of 219 as described in connection with film 206 on the bottom of base 200.

It is obvious from Figure 9 that the compass beam 240 and 60 together with cursor 260 holding a scriber and with pivot 220 may be pulled apart from base 200 and center indicating means 270 and made to function as a known beam compass; a tip for the purpose is provided on pivot 220 at 224; pivot 220 may be positioned in clamp 253 with pivot tip 224 and scriber tip as 33 equally spaced below the compass beam.

This invention is intended to comprise pivot supports for a beam compass, which is able by itself, without said pivot supports, to draw circles of all sizes requirable on a drafting board, with the pivot engaging the drafting surface. In such a compass, it must be possible to bring pivot tip 224 into contact with the scriber tip, as 43, in Figure 16, in order to enable the drafting of circles from zero radius up. In this arrangement, pivot 220 extends through clamp block 253 as far as permitted by its upper sectionally reduced length 221, as is the case where the pivot is supported as shown in Figure 9. In the arrangement as a known type of beam compass as shown in Figure 16, the cursor 260 may comprise a knuckle pin 263 extending through the body of cursor 260, in perpendicular relation to the compass beam as 240. At least one corner of cursor 260, i.e., the corner remote from the side of the cursor which may be adjacent to a setting head, as 280, is rounded off co-axially with knuckle pin 263. The scriber shank enters the bottom of the cursor 260 and extends diametrically through knuckle pin 263 to the end of hole 262 therein. In Figure 16, the shank of scriber 40 is shown positioned in hole 262 in pin 263. A groove 265 in the bottom of cursor 260 permits a partial rotation of the knuckle pin-held scriber co-planarly with pivot 220. The scriber may be rotated from a vertical position parallel to the pivot 220 to an inclined position in which the scriber tip, shown as 43 and more positively defined with the ink scriber tip 33, and the pivot tip 224, are equally disposed vertically below the bottom of initial link 240. In such an inclined position of the scriber, the scriber axis forms an angle lying between 20 and 40 degrees with the vertical.

Means are illustrated by which the cursor may be secured in a selected one of the two positions described. Means shown comprise nut 267 on a threaded end of knuckle pin 263 and slotted washer 266 engaging flattening on the threaded end of the knuckle pin. A stud 268 in the cursor body selectively engages one of two holes in washer 266 and establishes the knuckle setting. Other means evident from the art may be used to selectively position the knuckle within the spirit of this invention.

In securing the scriber within the knuckle pin hole 262, the scriber extends through clamp block 300 disposed traversely below cursor's body 260 dependant from ends of knuckle pin 263, by means including strap 302. Slot and screw means 301 fasten the scriber in the clamp block, or stirrup, 300, with the scriber shank extending into the knuckle pin as previously related.

To insure alignment in all phases of use, and to improve the balance of the instrument, in the embodiment shown in Figures 9 to 18, inclusive, initial beam link 240 is made symmetrical in length about the axis of pivot 220; structural features are incorporated in link 240, only, and in cursor 260 to insure assembly of link 240 and cursor 260 with the same edge of the link contacting the same guide flange of the cursor; cursor guide flange 327 is made longer than flange 328 and pads 337 and 338 in plan detail, Figure 15, of initial link 240 are eccentrically disposed to allow only the shorter lip 328 to pass pads 337 and 338 on the narrowed side. Extension links 60 are joinable at either end of initial link, there being no need for restricting the relationship in assembly of the cursor with the extension links. Related scale divisionings may be applied to each end of the initial link, symmetrically increasing towards both ends and continuing on extension links, from the extension to the receiving connection end on each link 60. The position of the zero scale mark "$0_1$" on "End No. 1" of Figure 15 is derived by locating the scriber as 30 co-axially with pivot 220 in the assembly of Figure 13 and scribing on initial link 240 a zero value line at end 269 of the cursor; the scriber, held perpendicularly to the initial link, is seen to be shifted under "End No. 1" in Figures 9 and 13; and as stated in the description of the hinge detail, hinge pin 255 is spaced from pivot 220 towards the end under which the perpendicularly held scriber is shifted. The distance along the initial link 240 from the axis of pivot 220 to cursor end 269 is arbitrarily established as one half of the projection on the compass beam of the length of the inclined scriber from the scriber tip, as 43, to the axis of knuckle pin 263 as evidenced in Figure 16. In the previous reference to the inclined scriber, wherein the position of pivot tip 224 was defined, the scriber tip is mentioned as shown as 43, but more positively defined with the ink scriber tip 33 (and equivalently, steel point tip 53).

With the zero scale marks thus established, and the scale markings for radius determination symmetrically equivalent on both ends of the initial link, end 269 as the leading end of the cursor indicates radius values over initial link "End No. 1" and extension links joined thereto, with the scriber held perpendicularly in the cursor; with the scriber held inclined in the cursor, and the beam compass used without the pivot supports, cursor end 269 as the trailing end of the cursor indicates radius values over initial link "End No. 2" in Figure 16, and over extension links joined to said End No. 2, but not shown.

An unsymmetrical link, lengthwise, similar to initial link 140 in the embodiment shown in Figures 1 to 8, may be used with the embodiment of Figures 9 to 18 if desired. Such an initial link must be symmetrical about its longitudinal axis, as the cursor must be turned around with respect to the initial link, if the scriber is held inclined instead of perpendicular. Scale values may be applied to a single link end, with the relationship between the zero scale mark, the arbitrary extension of the cursor end 269 and the projection of the inclined scriber length holding as described.

A peg 225 in pivot 220 in Figure 12, is positioned in groove 350 in hinge clamp 253 to orient the clearance grinding shown on one side of pivot tip 224. Hole 264 in the top of cursor 260 provides for a construction alignment check with a properly constituted guage pin, whereby the alignment of bearing 236, clamp 253, cursor 260, knuckle pin 263, stirrup 300 and center indicating needle 273 may be verified.

The embodiment of Figures 9 to 18 inclusive show initial link 240 slidably extending traversely through guide flanges atop both cursor 260 and setting head 280. The setting head 280, if used, positions cursor 260 by means of vernier screw 281 arranged in parallel relation to the length of the compass beam as link 240; Figure 18 shows screw rod 281 extending through setting head 280 and rotatable therein. Screw rod 281 is secured against transition in setting head 280 by knurled terminal nut 282 and collar 289. Rod 281 is threaded beyond collar 289 as it extends through the cursor body in shiftable threaded engagement as at 283 in Figure 18. Screw rod 281 extends through knuckle pin 263, spaced apart from scriber hole 262, traversing rotation-enabling slot 285. Guide rod 284 may extend slideably through 260 parallel to screw rod 281 and be affixed in setting head 280. Rod 284 also extends through a rotation-enabling slot in knuckle-pin 263 and is spaced apart from scriber hole 262 and remote from rod 281 as seen in end view Figure 11. Screw 286 clamps setting head 280 to the compass beam in selected positions.

Certain of the accessory features described in connection with the embodiment shown in Figures 9 to 18, inclusive, are obviously applicable to the embodiment shown in Figures 1 to 8, inclusive. Provision may be made in pivot bearings 130 and 131 for anti-friction bearing means as shown in sleeve 236. A spiral spring similar to spring 290 may be applied to collar 129. Detent means, as 291 or equivalent, may be applied at bearings 130 and 131 to oppose any spring applied in collar 129. Hinge and catch means may be applied in clamp block 150. Scale markings may be applied to initial link 140, with the end of cursor 160 remote from setting head 180 being arbitrarily extended as an index, as 269 on cursor 260. Initial link 140 may be made symmetrical lengthwise, as link 240, and so no longer necessarily symmetrical widthwise. Tubular pivot 120 adjacent its ends may be reduced in annular section, and the hole 151 in block 150 may be correspondingly changed, to facilitate prompt accurate assemblies, as done with ends 221 and 222 on pivot 220.

As center indicating means, in the embodiment of Figures 1 to 8, sliding pin 170 need be used only in the arrangement for drafting large circles, Figure 6, in addition to its possible use as a fixed pivot for the beam without supports in Figure 7. Partial plan view 8A shows an alternate means for indicating the centers of small circles drawn to one side of the base in the embodiment of Figures 1 to 8, employing detail parts enumerated in connection with the embodiment of Figures 9 to 18. In Figure 8A, center indicating assembly 370 comprises a vertical shaft 271, secured on the top of annular base 102, as a pivot for horizontal finger 277. One pin 278 extends horizontally through finger 277. One needle 273, extends through pin 278. When finger 277 is rotated horizontally about pivot 271 into contact with median flange 103 as a limit, the tip of needle 273 contacts the locus 117 of the intersection of the axis of pivot 120 with base bottom plane 101 relative to base 100, indicating the second of the two positions in which pivot 120 may be supported relative to base 100. As previously described in connection with the embodiment of Figures 9 to 18, a compression spring 274 is housed about pivot 271 on the underside of finger 277, with the threaded upper end of pivot 271 extending through a knurled nut 275. With a vertical surface on finger 277 being horizontally swung adjacent to a vertical surface on median flange 103, with needle 273 indicating locus 117, spring 274 may be held compressed by tightening nut 275; with nut 275 loosened, spring 274 raises finger 277 and allows finger 277 to be swung out of the scriber path without occasioning scoring of the drafting surface by contact with needle tip 273. Obviously, the application of this center finding means to the embodiment of Figures 1 to 8 enables cursor 160 to set the scriber at radii down to and including zero value without having the center finding means interfere with positioning the cursor.

What is claimed is:

1. In combination: a beam compass, supporting means movable on drafting surfaces for spacing the compass pivot therefrom and enabling the drafting of circles of all requirable sizes, and circle center indicating means; with the beam compass comprising an initial link and extension links as required, a clamp block, a cursor block, a scriber and a pivot, scriber securing means at the cursor bottom and flanged guides on the cursor top; said links comprising elongated bars having end to end joining means, a hole extending vertically through the initial link, a hole extending through the clamp block, the clamp block fixed on top of the initial link with said holes aligned, the links traversely slidable between the cursor top flanged guides; the pivot comprising an elongated round tube, a collar affixed around the pivot and located intermediately of the pivot length, a journalling length along the pivot below the collar, the pivot extending through and clamped by said clamp block longitudinally perpendicular to the compass beam at a selected location on the pivot length, the cursor securing the scriber axially coplanarly shiftable with and parallel to the pivot; said supporting means comprising a flat generally annular base, a median flange vertically attached to the base, the flange cut out at its lower edge adjacent to the annular base opening, the flange comprising pivot journalling means including a hole extending vertically through said flange, joining means at the flange top edge, a vertical sleeve endwise attached to a cantilever, the sleeve comprising pivot journalling means including a hole extending vertically through the sleeve, spacing means attached under the cantilever, with joining means at the lower extremity of said spacing means; the pivot journalling means comprised in the base attached median flange journalling the pivot with its axis perpendicular to the plane of the base bottom at the center of the base in a first position; the vertical sleeve endwise attached to the cantilever with sub-attached spacing means joined on the top edge of the base attached vertical median flange journalling the pivot with its axis perpendicular to the base bottom plane to one side of the base in a second position basewise; the pivot when journalled in said first position, with the initial link clamped above the pivot collar, with extension links as required joined to the initial link and to each other implementing the drafting of large circles around the base; the pivot when journalled in said second position, with the initial link clamped at the lower end of the pivot implementing the drafting of small circles to one side of the base; the initial link being of sufficient length to enable the scriber when positioned at the end of the initial link to draw circles around the base, the cantilever being of sufficient length to enable the scriber likewise positioned at the initial link end to draw entire circles to one side of the base; with the circle center indicating means comprising an elongated pin slidable within the tubular pivot, pointed co-axially therewith, and releasably securable therein.

2. A beam compass with pivot supports and circle center indicating means as described in claim 1, wherein said initial link and the said congruent extension links comprise a shape selected from a class of shapes including rectangular, T and generally circular sections and wherein the said scriber comprises a terminal shank releasably securable in the cursor bottom and co-axial with the scriber tip, the said scriber being selected from a class of scribers equivalent in length and comprising a pencil scriber, an inking scriber, and a shaft pointed at the end opposite the shank.

3. A beam compass with pivot supports and circle center indicating means as described in claim 1, wherein the median vertical flange across the base is releasably affixed to said base, and wherein adhesively affixed to the flat base bottom is a film of material not injurious to drafting surfaces and more frictionally resistant to sliding over drafting surfaces than the material of the base bottom.

4. A beam compass with pivot supports and circle center indicating means as described in claim 1, with a screw rod arranged in parallel relation with the said compass beam, the beam slideably extending transversely between flanged guides atop a setting head, the said screw rod affixed to the cursor and extending through said head.

5. A beam compass with pivot supports and circle center indicating means as described in claim 1, wherein the beam compass cursor comprises a knuckle pin extending through the cursor body in perpendicular relation to the length of the compass beam, at least one lower cursor body corner rounded off coaxially with said knuckle pin, with the scriber shank entering the bottom of the cursor and extending diametrically within the knuckle pin and being secured therein by a screw disposed coaxially with the knuckle pin, a groove in the bottom of the cursor body permitting a partial rotation of the knuckle pin and the scriber co-planarly with the pivot, means for securing the knuckle pin with the scriber held in one of two positions, one position vertical and parallel with the pivot, and one position inclined at an angle lying between 20 and 40 degrees to the vertical, with set screw means insertable in the said tubular pivot for releasably positioning the slideable pin therein.

6. In combination: a beam compass, supporting means movable on drafting surfaces for spacing the compass pivot therefrom and enabling the drafting of circles of all requirable sizes, and circle center indicating means; with the beam compass comprising an initial link and extension links as required, a clamp block, a cursor block, a scriber and a pivot, scriber securing means at the cursor bottom and flanged guides on the cursor top; said links comprising elongated bars having end to end joining means, a hole extending vertically through the initial link, a hole extending through the clamp block, the clamp block fixed on top of the initial link with said holes aligned, the links traversely slidable between the cursor top flanged guides; the pivot comprising an elongated round bar with lower axial tip; a collar affixed around the pivot and located intermediately of the pivot length, a journalling length along the pivot below the collar, the pivot extending through and clamped by said clamp block longitudinally perpendicular to the compass beam at a selected location on the pivot length, the cursor securing the scriber axially coplanarly shiftable with and parallel to the pivot; said supporting means comprising a flat generally lunate base, with its concave opening extending into the base beyond the center of the base outer arc, a median flange vertically attached to the base, joining means at the top edge of the flange, a vertical sleeve endwise attached to a horizontal arm, a pivot journalling hole extending vertically through said sleeve, joining means on the under side of said horizontal arm, a cantilever, a spacing block edgewise attached under said cantilever, joining means at the upper side of the cantilever, and joining means on the under edge of the spacing block; the sleeve, with endwise attached horizontal arm joined on the top edge of the base median flange journalling the pivot with its axis perpendicular to the plane of the base bottom at the center of the outside arc of the base in a first position; the sleeve, with the endwise attached horizontal arm joined on the top side of the cantilever and the spacing block attached under the cantilever joined at the spacer under edge to the top edge of the base median flange journalling the pivot with its axis perpendicular to the base bottom plane at the center of the lunate base concave opening arc in a second position with respect to the base; the pivot when journalled in said first position, with the initial link clamped above the pivot collar, with extension links as required joined to the initial link and to each other implementing the drafting of large circles around the base; the pivot when journalled in said second position, with the initial link clamped at the lower end of the pivot implementing the drafting of small circles to one side of the base and partially within the concave opening of the lunate base; the initial link being of sufficient length to enable the scriber when positioned at the end of the initial link to draw circles around the base, the cantilever being of sufficient length to enable the scriber likewise positioned at the initial link end to draw entire circles to one side of the base, partially within the lunate base concave opening; with the center indicating means comprising a finger horizontally swingable about a pivot located on a tip of the lunate base, a swing stop on said base, and index points disposed on the finger, said index points, with the finger swung against the swing stop, simultaneously disclosing the loci, with respect to the base, of the pivot axis intersection with the base bottom plane in each of the two aforedescribed positions of the pivot with respect to the base.

7. A beam compass with pivot supports and circle center indicating means as described in claim 6, wherein said initial link and the said congruent extension links comprise a shape selected from a class of shapes including rectangular, T and generally circular sections and wherein the said scriber comprises a terminal shank releasably securable in the cursor bottom and co-axial with the scriber tip, the said scriber being selected from a class of scribers equivalent in length and comprising a pencil scriber, an inking scriber, and a shaft pointed at the end opposite the shank.

8. A beam compass with pivot supports and circle center indicating means as described in claim 6, wherein the median upstanding flange across the base is releasably attached to the said base and wherein adhesively affixed to the flat base bottom is a film of material not injurious to drafting surfaces and more frictionally resistant to sliding over drafting surfaces than the material of the base bottom.

9. A beam compass with pivot supports and circle center indicating means as described in claim 6, wherein the clamp block connecting the pivot to the initial link comprises a first block affixed to said link with a second block comprising a clamp with the pivot attached therein, said clamp disposed beam lengthwise within the first block, a hinge pin extending through both blocks perpendicular to the beam length and spaced apart from the pivot towards the end of the initial link traversed by the shiftable scriber with said scriber being perpendicularly disposed lengthwise to said initial link, with catch means releasably securing the second block to the first block with the inntial link lengthwise disposed perpendicularly to the pivot, said catch means spaced apart from the pivot towards the link end opposite the hinge.

10. A beam compass with pivot supports and circle center indicating means as described in claim 6, wherein the collar on said pivot houses a spiral spring in the collar underside disposed to raise the collared pivot apart from said sleeve, with detent means disposed to optionally hold the pivot collar adjacent the sleeve end contrary to the urging of said spiral spring.

11. A beam compass with pivot supports and circle center indicating means as described in claim 6, wherein the said bearing sleeve comprises internally two co-axial spaced apart anti-friction bearing rings.

12. A beam compass with pivot supports and circle center indicating means as described in claim 6 wherein the cross section of the opening for pivot extension through the clamp block is smaller than the cross section of the opening through the bearing sleeve for pivot extension therethrough, and wherein lengths of the pivot adjacent the pivot ends are reduced in section below the pivot midlength sectional area, with said end-adjacent sectionally-reduced pivot lengths enabling exact pivot-clamp block assemblies in the two described part arrangements.

13. A beam compass with pivot supports and circle center indicating means as described in claim 6 wherein the spacing block top extends as a cantilever over the opening in the lunate base as described, and wherein the opposite end of the spacing block which extends outwardly as a counterweight extends down outside the base to the plane of the bottom of the base.

14. A beam compass with pivot supports and circle center indicating means as described in claim 6 wherein the beam compass cursor body comprises a shaft extending therethrough as a knuckle pin in perpendicular relation to the length of the compass beam, at least one lower corner of the cursor body rounded off co-axially with the knuckle pin, with the scriber shank entering the bottom of the cursor and extending diametrically within the knuckle pin, the scriber extending through and secured by a clamp block, said clamp block disposed traversely below the cursor body and dependant from straps from the ends of said knuckle pin, a groove in the bottom of the cursor body permitting a partial rotation of the knuckle pin, and the scriber co-planarly with the compass pivot, together with means for securing the knuckle pin with the scriber held in one of two positions, one position vertical and parallel with the compass pivot, and one position inclined at an angle lying between 20 and 40 degrees to the vertical, at which inclination the tip of the inclined scriber and a terminal axial pointing on the pivot are equally spaced vertically below the compass beam.

15. A beam compass with pivot supports and circle center indicating means as described in claim 14, wherein the initial beam link is symmetrical in length about the pivot axis, with one cursor traverse guide flange exceeding in length the opposite flange, an obstruction atop the initial link allowing shifting thereby of only the shorter flange, with both initial link ends joinable to extension link ends, with related scale markings applied to extension links, and with symmetrical markings from the pivot to both initial link ends, with the zero scale value derived from a cursor end location established by shifting the scriber into co-axiality with the pivot, said cursor end being adjacent the link end traversed by the scriber when perpendicular; with said cursor end arbitrarily spaced from the locus within the cursor of the perpendicularly ularly held scriber axis a length equal to one half of the tion on the compass beam of the scriber inclined as described from the scriber tip to the knuckle pin axis.

16. A beam compass with pivot supports and circle center indicating means as described in claim 14, wherein the initial beam link and the cursor are mutually reversible in assembly, with related scale markings applied to the initial link and to the extension links, with the zero radius setting scale value derived from a cursor end location established by shifting the scriber into co-axiality with the pivot, said cursor end being adjacent the link end traversed by the scriber; with said cursor end arbitrarily spaced from the locus within the cursor of the perpendicularly held scriber axis a length equal to one half of the projection on the compass beam of the scriber inclined as described from the scriber tip to the knuckle pin axis.

17. A beam compass with pivot supports and circle center indicating means as described in claim 14, with a screw rod arranged in parallel relation with the said compass beam, the compass beam slideably extending between flanged guides atop a setting head, said screw rod extending through said setting head and rotatable therein and secured against transition relative to said setting head by a collar and terminal knurled nut, the screw rod for its length beyond the setting head threaded and extending in threaded adjustable engagement through the cursor body, the screw rod within the cursor body extending through a partial rotation-permitting slot in the knuckle pin in spaced apart relationship to provision within the knuckle pin for the scriber shank.

18. A beam compass with pivot supports and circle center indicating means as described in claim 1, with additional center indicating means comprising a vertical shaft secured in the annular base, said shaft extending as a pivot through one end of a horizontal finger, a pin extending horizontally through said finger, a needle extending diametrically through said pin, and with said finger disposed in contact with said upstanding base flange, the needle inclined to contact the locus with respect to the base of the intersection with the base bottom plane of the axis of the pivot positioned by the sleeve attached to the bracket cantilever end, with said bracket supported by said base.

19. In combination: a beam compass, supporting means movable on drafting surfaces for spacing the compass pivot therefrom and enabling the drafting of circles of all requirable sizes, and circle center indicating means; with the beam compass comprising an initial link and extension links as required, a clamp block, a cursor block, a scriber and a pivot, scriber securing means at the cursor bottom and flanged guides on the cursor top; said links comprising elongated bars having end to end joining means, a hole extending vertically through the initial link, a hole extending through the clamp block, the clamp block fixed on top of the initial link with said holes aligned, the links traversely slidable between the cursor top flanged guides; the pivot comprising a round member positioning an axial lower tip, a collar affixed around the pivot and located intermediately of the pivot length, a journalling length along the pivot below the collar, the pivot extending through and clamped by said clamp block longitudinally perpendicular to the compass beam at a selected location on the pivot length, the cursor securing the scriber axially coplanarly shiftable with and parallel to the pivot; said supporting means comprising a flat generally arcuate base, at least partly enclosing an opening revealing the base bottom plane and including the center of the external arc of the base, a median flange vertically attached to the base and configured to disclose said base bottom opening, joining means disposed at the top edge of said median flange, pivot journalling means positionable by said base attached median flange, a vertical sleeve with a pivot journalling hole extending vertically therethrough, a cantilever, spacing means attached under the cantilever, with joining means disposed at the lower extremity of said spacing means; the vertical sleeve positionable by means including the cantilever; the pivot journalling means positionable by the base median flange journalling the pivot with its axis perpendicular to the base bottom plane at the center of the base external arcuate outline in a first position; the vertical sleeve, when positioned by the cantilever with the spacing means attached under the cantilever joined at the lower extremity of said means to the top edge of the base median flange journalling the pivot with its axis perpendicular to the base bottom plane at one side of the base in a second position with respect to the base; the pivot when journalled in said first position, with the initial link clamped above the pivot collar, with extension links as required joined to the initial link and to each other implementing the drafting of large circles around the base; the pivot when journalled in said second position, with the initial link clamped at the lower end of the pivot implementing the drafting of small circles to one side of the base; the initial link being of sufficient length to enable the scriber when positioned at the end of the initial link to draw circles around the base, the cantilever being of sufficient length to enable the scriber likewise positioned at the initial link end to draw entire circles to one side of the base; the center indicating means comprising retractable indicators disposed to disclose the loci of the intersections of the axis of the pivot with the base bottom plane with respect to the base in the positions of the pivot with respect to the base as described, said means being selected from a group of retractable indicators including an axially pointed pin slidable within said compass pivot comprised as a tube, and index points in number as required mounted on a member pivoted on the said flat base.

References Cited in the file of this patent

UNITED STATES PATENTS

| Number | Name | Date |
|---|---|---|
| 32,566 | Jamison | June 18, 1861 |
| 211,825 | Worthington | Jan. 28, 1879 |
| 371,160 | Wylie | Oct. 4, 1887 |
| 623,227 | Veronese | Apr. 18, 1899 |
| 813,827 | Ring | Feb. 27, 1906 |
| 1,352,320 | Souders | Sept. 7, 1920 |
| 1,460,093 | Costovici | June 26, 1923 |
| 1,461,530 | Kaminski | July 10, 1923 |
| 1,629,143 | Bungart | May 17, 1927 |
| 1,948,952 | Wallerius | Feb. 27, 1934 |
| 2,046,508 | Friess | July 7, 1936 |
| 2,483,229 | Parker | Sept. 27, 1949 |
| 2,567,265 | Woodward | Sept. 11, 1951 |
| 2,595,795 | Kovach | May 6, 1952 |
| 2,600,139 | Thomas | June 10, 1952 |